United States Patent
Stadler et al.

(10) Patent No.: US 9,297,460 B2
(45) Date of Patent: Mar. 29, 2016

(54) PRESSURIZABLE SEALING ELEMENT

(75) Inventors: Achim Stadler, Weinheim (DE); Armin Barth, Gorxheimertal (DE)

(73) Assignee: Achim STADLER, Weinheim (DE)

(*) Notice: Subject to any disclaimer, the term of this patent is extended or adjusted under 35 U.S.C. 154(b) by 882 days.

(21) Appl. No.: 13/375,851

(22) PCT Filed: Jun. 5, 2009

(86) PCT No.: PCT/EP2009/004046
§ 371 (c)(1),
(2), (4) Date: Dec. 23, 2011

(87) PCT Pub. No.: WO2010/139348
PCT Pub. Date: Dec. 9, 2010

(65) Prior Publication Data
US 2012/0112102 A1    May 10, 2012

(51) Int. Cl.
*F16K 7/02* (2006.01)
*F16K 7/10* (2006.01)

(52) U.S. Cl.
CPC .... *F16K 7/02* (2013.01); *F16K 7/10* (2013.01)

(58) Field of Classification Search
CPC ... F16L 55/134; F16L 55/132; F16L 55/1283; F16K 7/10; F16K 7/02; G01M 3/2853
USPC .................... 15/104.05, 104.061; 138/90, 93; 251/61.1
See application file for complete search history.

(56) References Cited

U.S. PATENT DOCUMENTS

| | | | |
|---|---|---|---|
| 3,224,734 A | | 12/1965 | Hill |
| 3,870,085 A | * | 3/1975 | Schneider ..................... 138/93 |
| 4,250,926 A | * | 2/1981 | Satterthwaite et al. ......... 138/90 |
| 4,342,336 A | * | 8/1982 | Satterthwaite et al. ......... 138/90 |
| 4,413,653 A | * | 11/1983 | Carter, Jr. ..................... 138/89 |
| 4,423,754 A | * | 1/1984 | Carter, Jr. ..................... 138/93 |
| 4,467,835 A | * | 8/1984 | Champleboux ................ 138/93 |
| 4,506,706 A | * | 3/1985 | Sandmann .................... 138/93 |
| 4,526,207 A | * | 7/1985 | Burkley et al. ................ 138/93 |
| 4,612,961 A | * | 9/1986 | Vetter ........................... 138/93 |
| 4,790,356 A | * | 12/1988 | Tash ............................. 138/93 |
| 4,964,439 A | * | 10/1990 | Vanderlans ................... 138/93 |

(Continued)

FOREIGN PATENT DOCUMENTS

DE    298 03 918    7/1998
EP    0 264 973    4/1988

(Continued)

OTHER PUBLICATIONS

"Stopple Plugging Machines", Bulletin 501.0 dated Mar. 1, 1981 (Spec., pp. 1-2).

(Continued)

*Primary Examiner* — Craig Schneider
*Assistant Examiner* — Frederick D Soski
(74) *Attorney, Agent, or Firm* — Collard & Roe, P.C.

(57) ABSTRACT

The invention relates to a sealing element (10) to be mounted on a plugging head (76). The plugging head (76) is introduced into an access opening in the pipeline (70) or pipe (70). The pressurizable sealing element (10) delimits at least one pressurizable cavity (22, 92) with an inner surface (78), and seals an inner wall (74) of the pipeline (70) or pipe (70) with a generated surface (16, 40, 46, 48) when a pressure $p_i$ is applied to the cavity (22, 92).

16 Claims, 10 Drawing Sheets

(56) References Cited

U.S. PATENT DOCUMENTS

Figure 1:
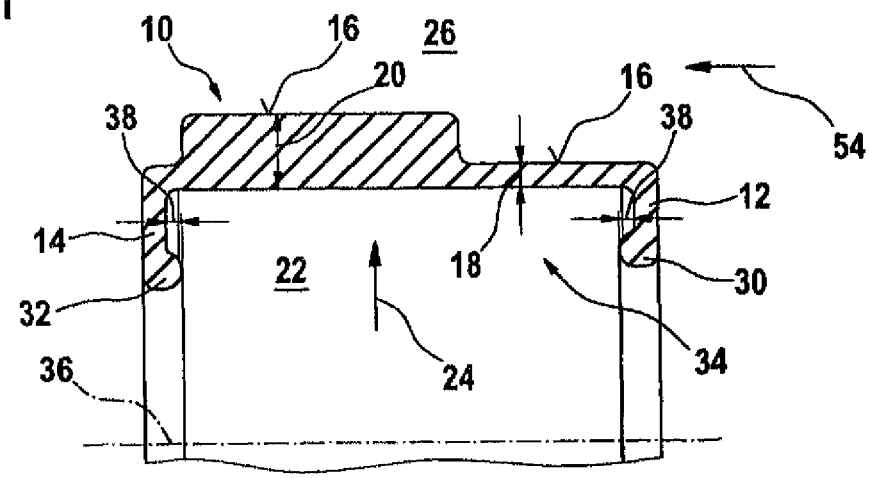

| | | | |
|---|---|---|---|
| 5,209,266 A | 5/1993 | Hiemsoth | |
| 5,771,937 A * | 6/1998 | Collins | 138/93 |
| 7,073,535 B1 * | 7/2006 | Warmerdam | 138/93 |
| 7,597,118 B1 * | 10/2009 | Peterson et al. | 138/93 |
| 2004/0216794 A1 * | 11/2004 | Beckey et al. | 138/93 |
| 2007/0210525 A1 | 9/2007 | Saltel | |

FOREIGN PATENT DOCUMENTS

| | | |
|---|---|---|
| FR | 1 443 237 | 6/1966 |
| FR | 2 507 737 | 12/1982 |
| FR | 2 856 456 | 12/2004 |
| GB | 1 433 884 | 4/1976 |
| JP | 11-037339 | 2/1999 |
| RU | 39377 U1 | 7/2004 |
| SU | 1765338 A1 | 9/1992 |

OTHER PUBLICATIONS

International Search Report of PCT/EP2009/004046, Mar. 17, 2010.

English translation of International Preliminary Report on Patentability of PCT/EP2009/004046, Dec. 8, 2011.

* cited by examiner

PRESSURIZABLE SEALING ELEMENT

CROSS REFERENCE TO RELATED APPLICATIONS

This application is the National Stage of PCT/EP2009/004046 filed on Jun. 5, 2009. The international application under PCT article 21(2) was not published in English.

TECHNICAL FIELD

The present invention refers to a pressurizable sealing element made of an elastomeric material, for example for securely plugging pressurized pipes for conducting media, such as oil or gas pipes, or even water pipes.

TECHNICAL BACKGROUND

Special plugs which may be part of a plugging head may be used for repairing pipelines or pipes which may conduct pressurized media such as oil, gas or even water. The plugging head is part of a hot-tapping equipment for repairing pressurized pipelines, for example. Hot tapping means drilling in a pressurized state and is a method adapted for drilling a hole in a pressure-conducting body and for forming a branching or bypass or bypass line in case of pipe portions which have to be repaired or even replaced. The hot-tapping process is carried out without operational interruptions and without leakage, providing the advantage that the pipeline operation can be maintained during repair works. In addition to the hot-tapping process (drilling under pressure), a line-stopping process has been commonly used. The line-stopping process is a method which enables a temporary interruption of a flow of media in a pipeline portion. Such an interruption of a flow of media through a pipe can be performed in case of repair, relocation and reconstruction works.

In case of equipment which may be used for performing the hot-tapping or line-stopping method, respectively, common elastomeric sealing disks are usually used, none of them, however, being able to fulfill the very specific process needs and requirements with 100 percent reliability. Examples for existing sealing principles come from companies such as IPSCO GmbH or T. D. Williamson, Inc., Tulsa, Okla. USA. T. D. Williamson Inc. of Tulsa, Okla., USA, for example, provides "stopple plugging machines" which are useful for maintaining the operation of a pipeline system during repair works. The TDW Inc. system known from bulletin No. 501.0 (Mar. 1, 1981) includes a hydraulic cylinder, a plugging head body, and a plugging head. A plurality of plugging heads of different sizes can be used together with this hydraulic cylinder. Typically, the "stopple plugging machine" from bulletin No. 501.0 of Mar. 1, 1981 is attached to a fitting which is flange-mounted to a tee of the pipeline. The body which accommodates the plugging head is flange-mounted thereon, and then, after application of a force to the hydraulic cylinder, the plugging head is introduced into the tee. The plugging head of the "stopple plugging machine" (cf. bulletin 501 of Mar. 1, 1981) has a lower end formed with a roll which abuts the lower part of the inner pipeline wall for aligning the plugging head during the further introducing movement which is essentially in a vertical direction, and for moving said plugging head into its sealing position. A sealing disk made of elastomeric material is mounted to the outer wall of the plugging head. When introducing the plugging head into the flow section to be sealed, it is reciprocated several times in order to "brush" the inner wall of the pipe or pipeline to remove deposits. As a result thereof, the sealing disk may be damaged to an extent where sealing becomes impossible. After moving the plugging head to its sealing position, the plugging head shuts off the pressure of the media prevailing within the pipeline. The flow directional pressure within the pipeline or pipe sealingly urges a sealing disk against the inner pipeline wall.

Meanwhile, it has been found that a very large radial gap between the plugging head (plug) and the inner pipeline wall of 20 mm or more cannot be sealed completely by using known approaches, and that process-reliability can therefore not be ensured. Considerably deformed cylindrical pipes of oval cross section cannot be sealed process-reliably by the annular sealing disk mounted to the plugging head, since it is in fact their oval shape which leaves relatively large gaps that cannot be bridged or sealed by a circular sealing disk. Moreover, it has been found that malleable sealing elements which have been used in known approaches are partly or completely undercut by the pressure to be shut off, and that it becomes impossible to dismount the whole sealing structure including the plugging head from the sealed flow section due to the constantly applied pressure which is to be shut off.

DESCRIPTION OF THE INVENTION

It is an object of the present invention to provide a sealing principle which is able to constantly resist a flux pressure prevailing in a piping portion where repair works are performed, which is therefore applicable to hot-tapping processes, and which is not deformed and can therefore smoothly be removed from the flow section after completing the repair works.

According to the present invention, a base and mounting body is provided which is preferably made of metallic material, and which is operable as a plugging element of a plugging head, and on the outer periphery of which the inventive pressurizable sealing member is mounted. The latter is preferably statically sealed at both axial sides thereof by positive and non-positive fit. The pressurizable sealing member can be expanded in a radial direction by the application of pressure. The expansion of the sealing element in a radial direction for bridging or closing radial gaps in a range of 20 to 30 mm or even more is pressurized, and its outer lateral surface sealingly abuts the inner surface of the pipeline flow section to be sealed. Sealing is effected when the sealing element is pressurized, the sealing resisting a pressure level to be shut off of 10 bars to 80 bars or even more.

Pressurization by pressurizing media such as pressurized air or a hydraulic fluid, for example, results in the articulated or hinged deployment or erection of the pressurizable sealing element proposed by the present invention by a spring bellows or a swellable spring integrated with the sealing element and facing the pressure side, or by a portion of the lateral surface configured to have a small wall thickness. When the cavity below the sealing element is pressurized, a portion of the lateral surface which is configured to have a larger wall thickness is hingedly deployed and contacts the inner wall of the pipeline flow section to be sealed, and maintains this sealing position throughout the pressure application process performed on the sealing element. The portion which is configured to have a small wall thickness, or a bellows or a swellable spring or the like, respectively, is operable as an actuator for the hinge-like deployment of the portion of the lateral surface of the pressurizable sealing element which is configured to have a larger wall thickness, and which adapts to the inner wall of the pipe or pipeline flow section to the sealed. The pressurizable sealing element proposed by the present invention is able to reliably shut off large radial gaps between the outer periphery of the plugging head and an inner diameter of the flow section to be sealed in a range of 20 mm to 30 mm, even in case of a higher pressure level. This sealing of higher pressures is effected by at least one, preferably more than one circumferentially abutting sealing lip at a shape-retaining side of the sealing element proposed according to the present invention configured to have a larger thickness. Preferably, the at least one sealing lip is also contacted or engaged with the inner diameter of the pipeline to be sealed by a pressure applied in the media flow direction, which further assists a process-reliable sealing. This enables also the sealing of extremely non-round, already deformed, or twisted pipes.

The opening to a pressurization hole of an interior of the sealing element is located at the plugging head's lateral surface, below a portion of the sealing lip configured to have a larger wall thickness. The cavity is vented, if necessary, by applying a negative pressure at a hole which also opens to the cavity below the pressurizable sealing element. By simply venting and applying a negative pressure, if necessary, the large radial gap between the outer periphery of the pressurizable sealing element and the inner pipe surface is released process-reliably, too.

In a first embodiment, the pressurizable sealing element proposed according to the present invention may have a U-shape and bead-like thickenings at its inner surface for fixing the pressurizable sealing element in grooves formed in the end face regions of the plugging head, for example. In the first embodiment of the sealing element proposed according to the present invention, the lateral surface may be formed with a portion of reduced wall thickness which gradually changes to a portion of larger wall thickness; however, the thicker-walled portion of another, second embodiment of the pressurizable sealing element proposed according to the present invention may have a sealing lip formed at its outside. This sealing lip is located at a radial outer side, spaced apart from the outer lateral surface of the pressurizable sealing element, and is expanded by the flow-directional pressure, which further improves the tight adaptation of the sealing lip to the entire inner wall of the pipe to be sealed. When the sealing element is pressurized, it abuts to the inner wall of the flow section to be sealed along an axial sealing length.

As a modification of this other, second embodiment of the pressurizable sealing element proposed according to the present invention, the portion of the molded seal configured to have a larger wall thickness may be provided with a plurality of cascading sealing lips which are arranged in a row, and which implement the sealing effect.

In another, fourth embodiment of the pressurizable sealing element proposed according to the invention, the bead-like thickenings of the lateral surface are configured to form the static sealing beads which extend in a radial direction. In this case, the pressurizable sealing element proposed according to the present invention is not U-shaped, but is rather of a sleeve-type which is formed without end faces, wherein the bead-like thickenings in the three preceding embodiments, which are adapted to fix the pressurizable sealing element, are located at the ends of the lateral surfaces of the sleeve-like sealing element.

In another, fifth embodiment of the idea underlying the present invention, the pressurizable sealing element is configured to have a swellable spring which is similar to a bellows. This swellable spring extends in the lateral surface of the pressurizable sealing element proposed according to the present invention in a wave-like or zigzag-like arrangement, for example. In this fifth embodiment of the pressurizable sealing element, the bead-like thickenings for fixing the pressurizable sealing element are located at the inner surface, similar to the embodiments described above, with the exception of the fourth embodiment.

The pressurizable sealing element proposed according to the invention may be provided at both axial ends with end faces which in turn may be provided with sealing beads for fixation. As an alternative to this embodiment of the pressurizable sealing element proposed according to present invention, a sleeve-like configuration may be considered. In this case, the end faces at the axial ends of the essentially sleeve-like pressurized sealing element are omitted at the outer surface; that is, the outer lateral surface of the sleeve is provided with a first bead-like thickening and a second bead-like thickening which enable the attachment of the sleeve-like pressurizable sealing element at a plugging head or in a plugging head, respectively, via clamping rings.

The attachment of the pressurizable sealing element proposed according to the invention at the outer surface of a plugging head is typically effected by the above-described beads which are fixed by clamping rings accompanied by the formation of overlapping structures. The shape of said overlapping structures may influence or preset the deformation path of the lateral surface of the pressurizable sealing element proposed according to the invention. When a chamber which is open to a pressurizing hole and/or a venting hole is pressurized, the lateral surface of the pressurizable sealing element is deformed or deformed so that its outer wall adapts to the inner wall of the pipeline or the pressure-conducting pipe to be sealed while bridging a gap between them. The medium pressure which is to be shut-off acts in an expanding direction on the at least one sealing lip which is formed above a free space, and which is further pressed against the inner surface of the pipeline to be sealed, due to the action of the applied pressure to be shut-off, which further improves the sealing effect.

In addition to the overlapping structures which cover the outer surfaces of the pressurizable sealing element proposed according to the invention, supporting shoulders on which the inner wall of the pressurizable sealing element rests in a non-pressurized state may be formed in the plugging head. The dimensions and the outline of the inner lateral surface of the pressurizable sealing element may also be used to preset its deformation movement in a radial direction.

The at least one clamping ring for mounting the pressurizable sealing element while covering a cavity of the plugging head may be formed as a one-piece or a two-piece structure. Clamping rings in a one-piece form are preferably attached in groove-shaped recesses at end faces of the plugging head in which a joint opening is formed.

The inventive approach of the pressurizably configured sealing element is further characterized by an integrated support function for controlling large pressure differences. This supporting function may, for example, be implemented by a fabric which reinforces the pressurizable sealing element and which is configured as a cured-in material, such as Nomex fabric, aramide fabric, Kevlar fiber. A PTFE wrapping tape or a polyamide wrapping tape, or even a spring steel tape formed as a support bracket sleeve having slits formed therein may also be considered.

This reinforcement is preferably attached at the clamping site of the pressurizable sealing element proposed according to the invention, where an atmospheric pressure prevails and which is located at the side facing away from the pressure to be shut-off. A pressure difference, which has to be stated as the major weakness and the main failure cause in all prior art approaches, has its maximum in this particular region.

As an alternative to the supporting function obtained by the integration of a reinforcing fabric into the material of the pressurizable sealing element, the enforcement may be implemented by a flap which retains its shape, wherein the hinge about which a lateral surface portion which is configured to have a larger thickness is deflected is formed by one of the overlapping structures of the clamping rings, for example.

SHORT DESCRIPTION OF THE DRAWINGS

Figure 2:
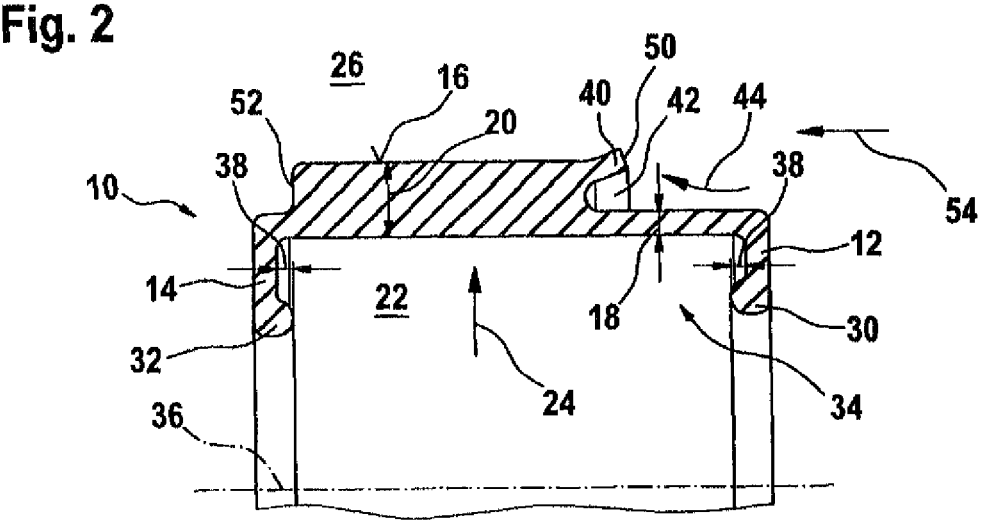
Figure 3:
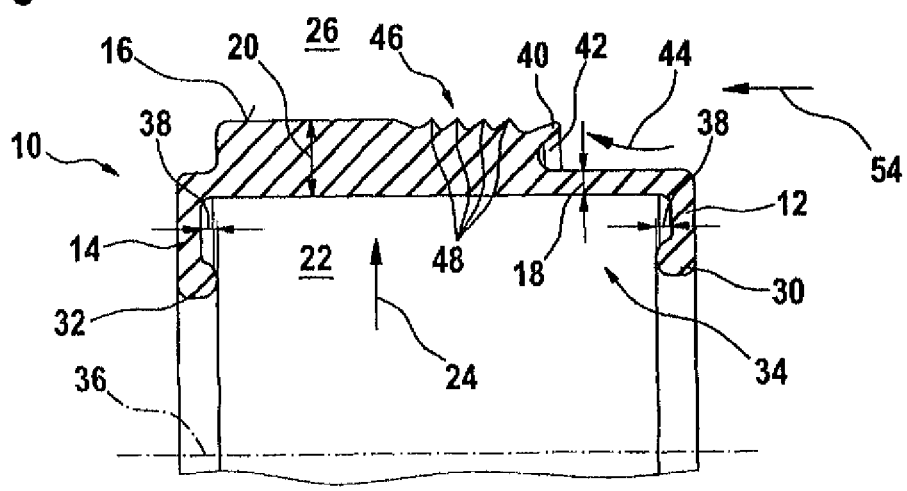
Figure 4:
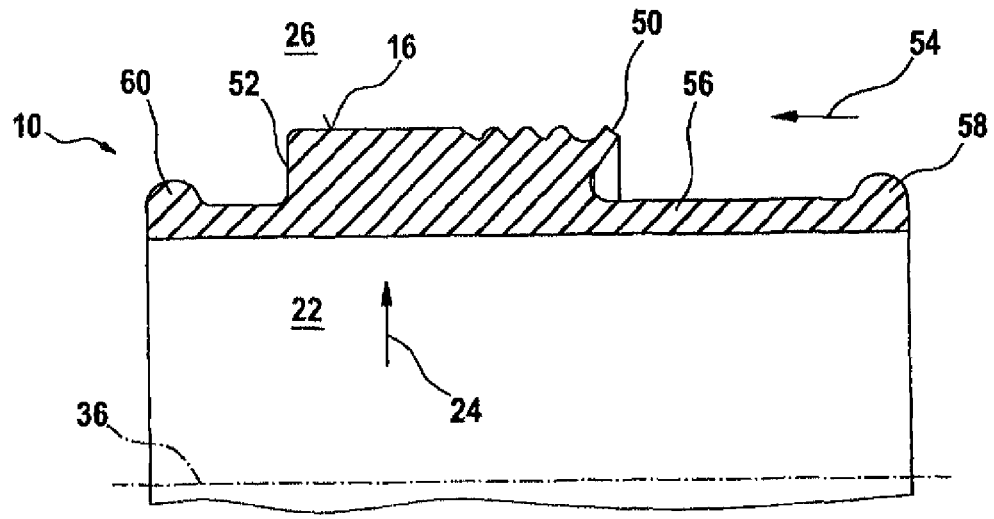

The invention will be discussed in detail with reference to the drawings wherein:

FIG. 1 shows a first embodiment of the pressurizable sealing element proposed according to the invention having lateral surface regions of differing wall thickness, FIG. 2 shows a second embodiment of the pressurizable sealing element proposed according to the invention having a deflectable sealing lip formed in a lateral surface region, FIG. 3 shows a third embodiment of the pressurizable sealing element proposed according to the invention having sealing lips cascadingly arranged in one axial row, FIG. 4 shows a sleeve-like embodiment of the pressurizable sealing element proposed according to the invention.

Figure 5:
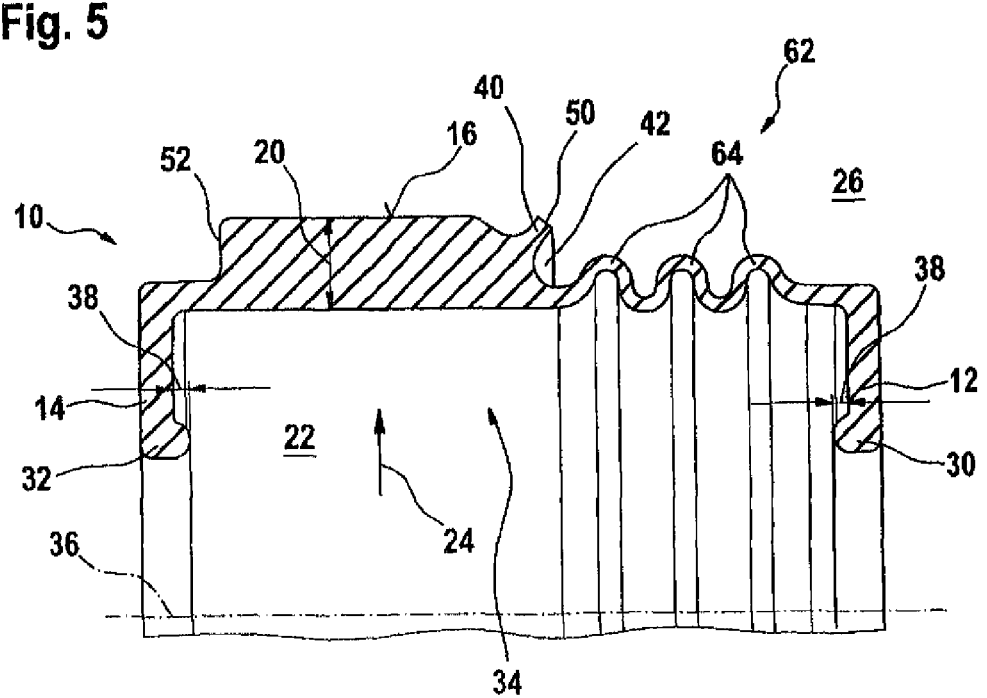
Figure 6:
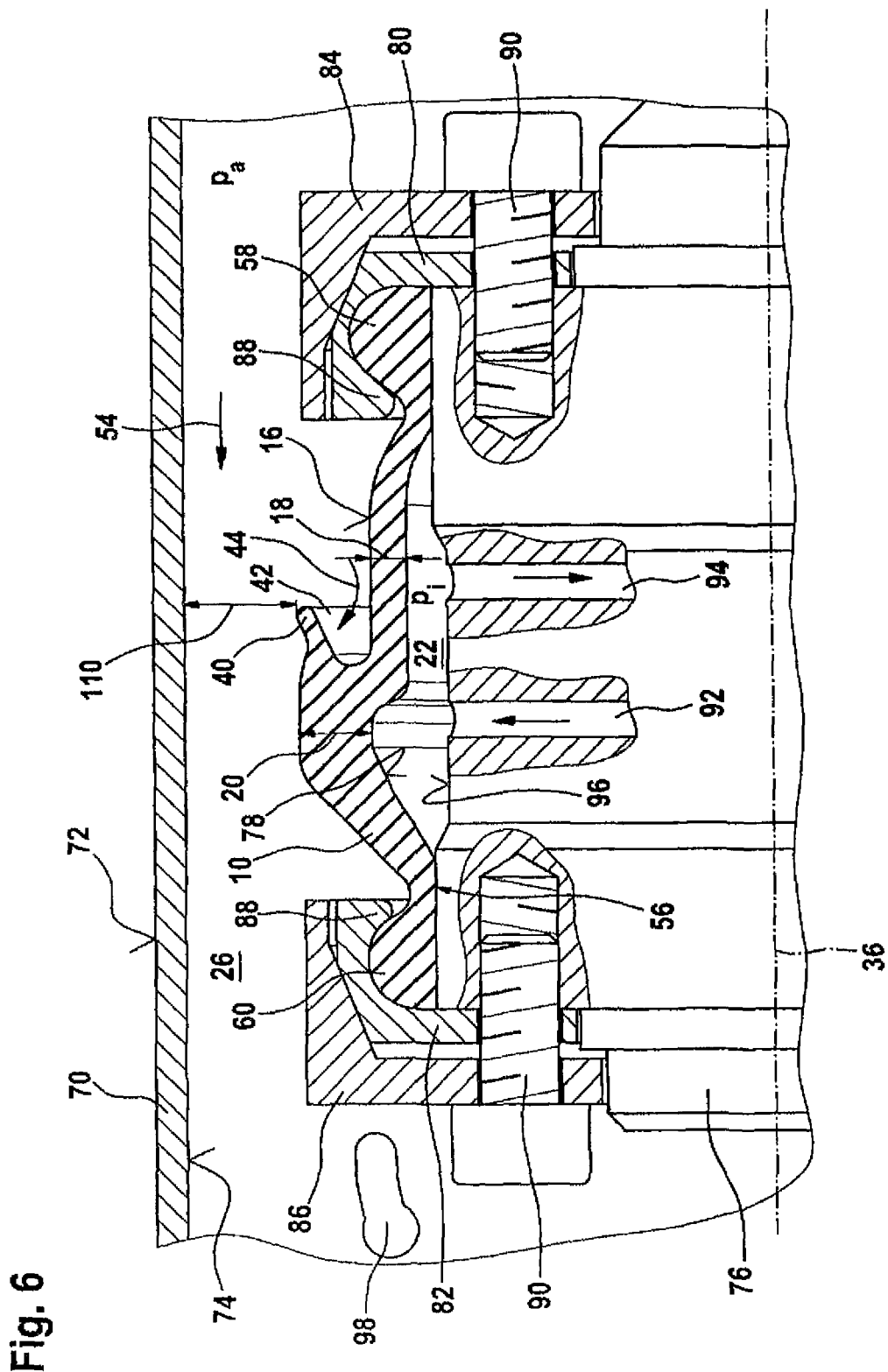
Figure 7:
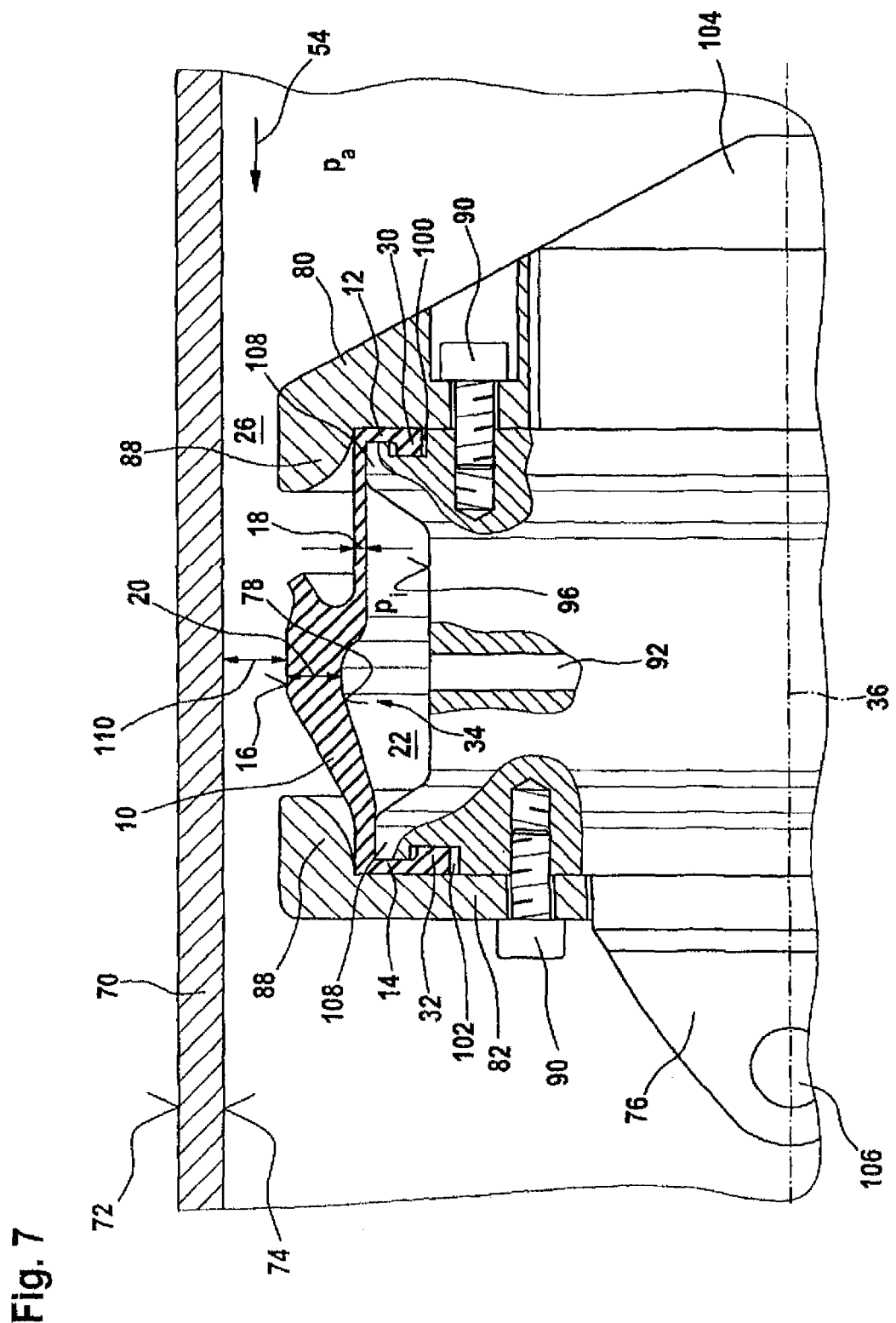

FIG. 5 shows another embodiment of the pressurizable sealing element proposed according to the invention having the bellows arranged upstream of the lateral surface region of a larger wall thickness, FIG. 6 shows the pressurizable sealing element according to FIG. 4 mounted at the plugging head, FIG. 7 shows the embodiments of the pressurizable sealing element proposed according to the invention as shown in FIGS. 1 to 3 mounted in the plugging head, but without pressurization.

Figure 8:
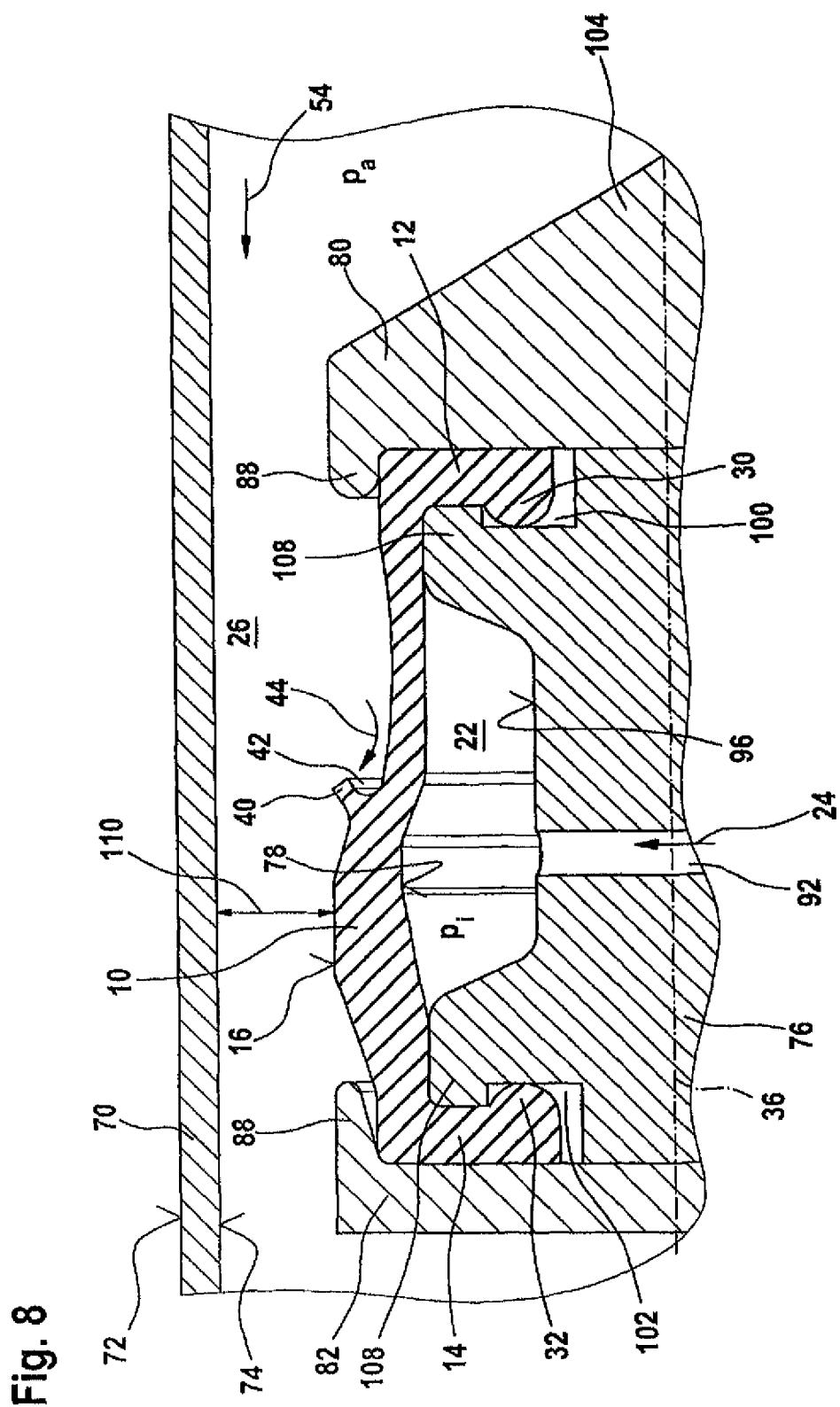
Figure 9:
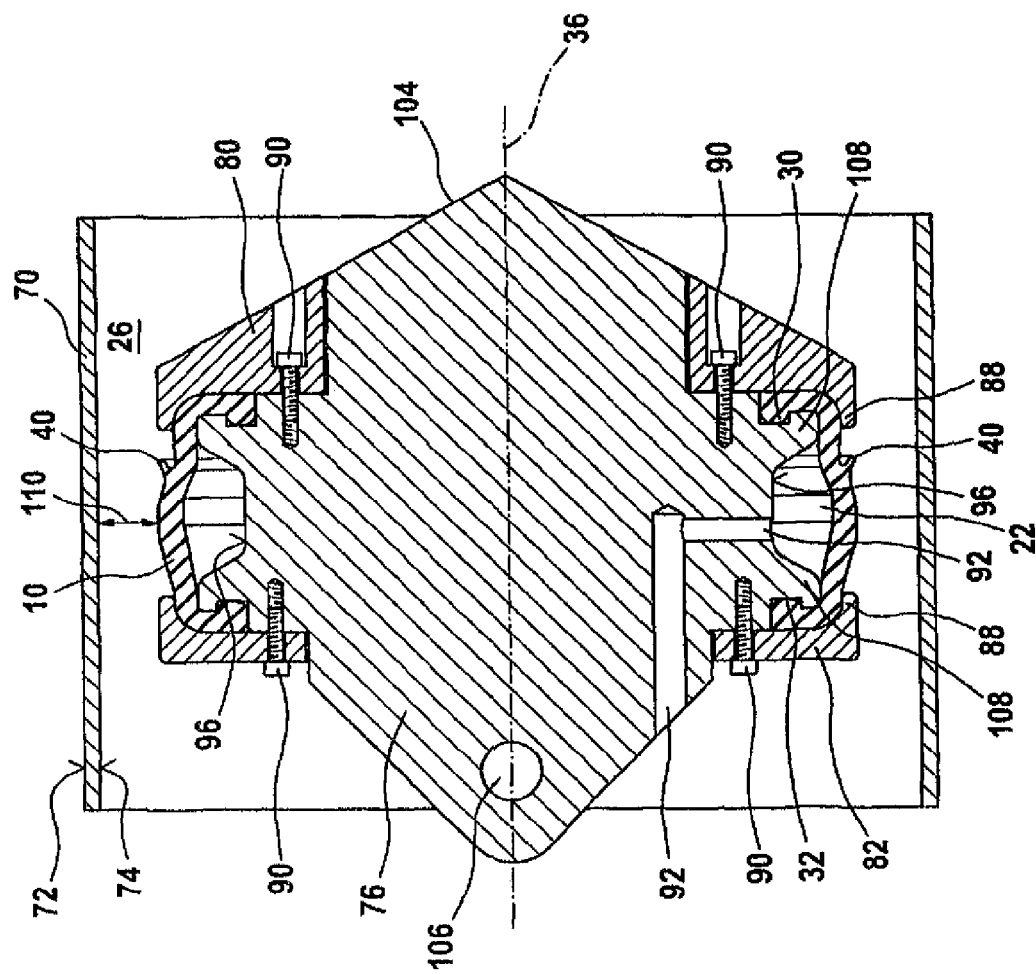
Figure 10:
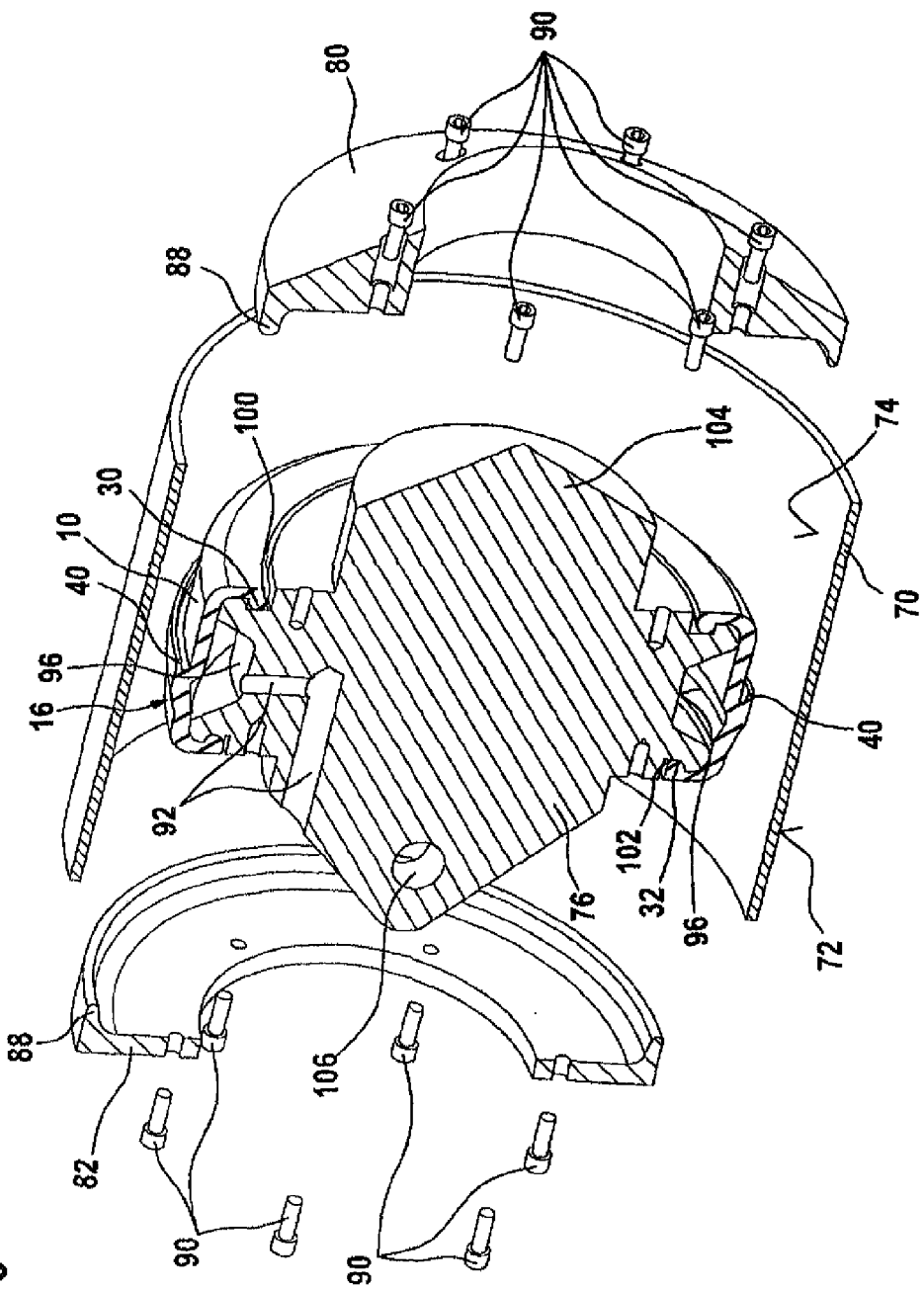
Figure 11:
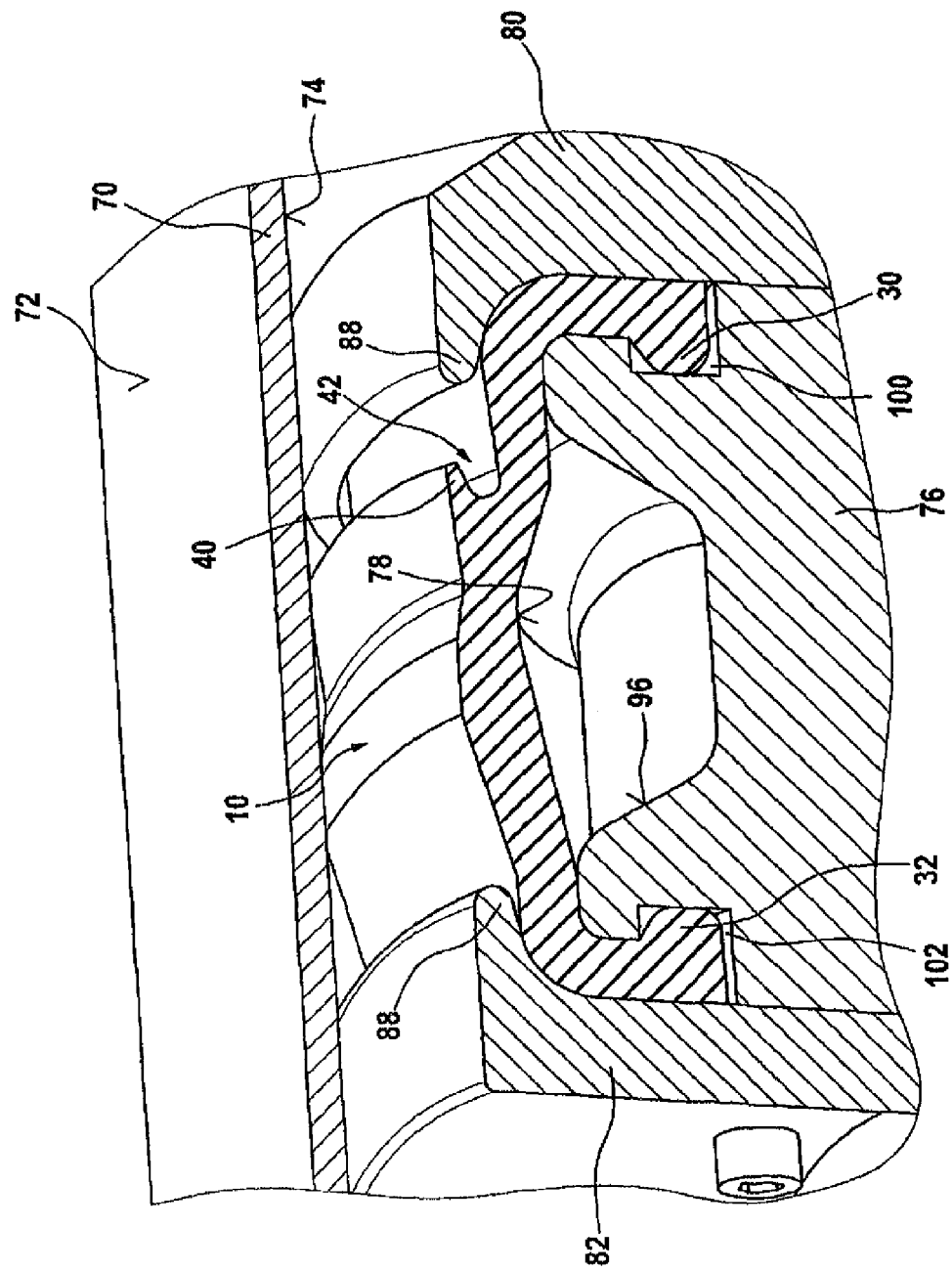
Figure 12:
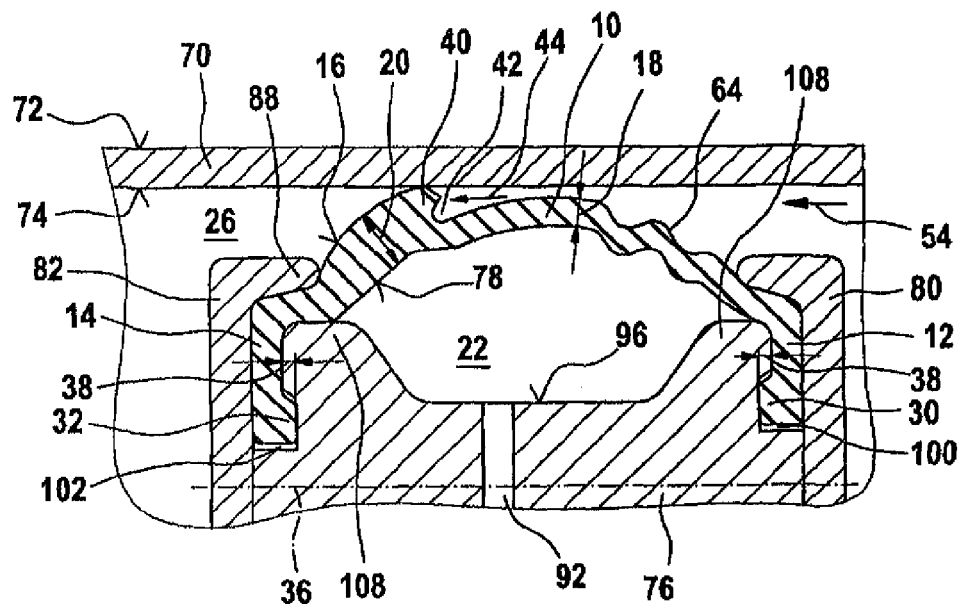
Figure 13:
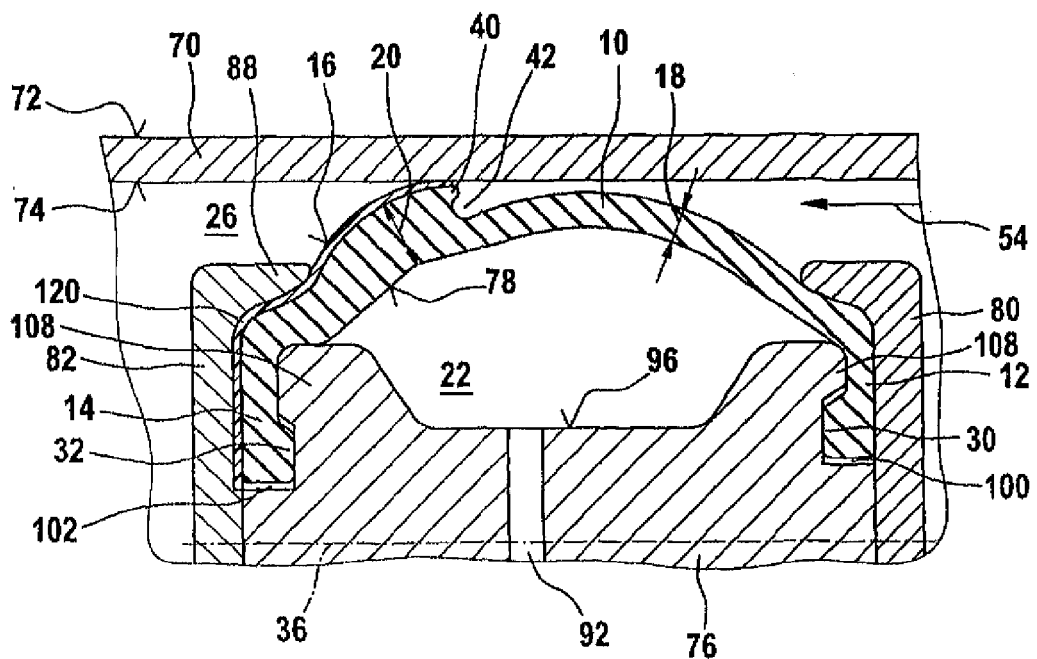
Figure 14:
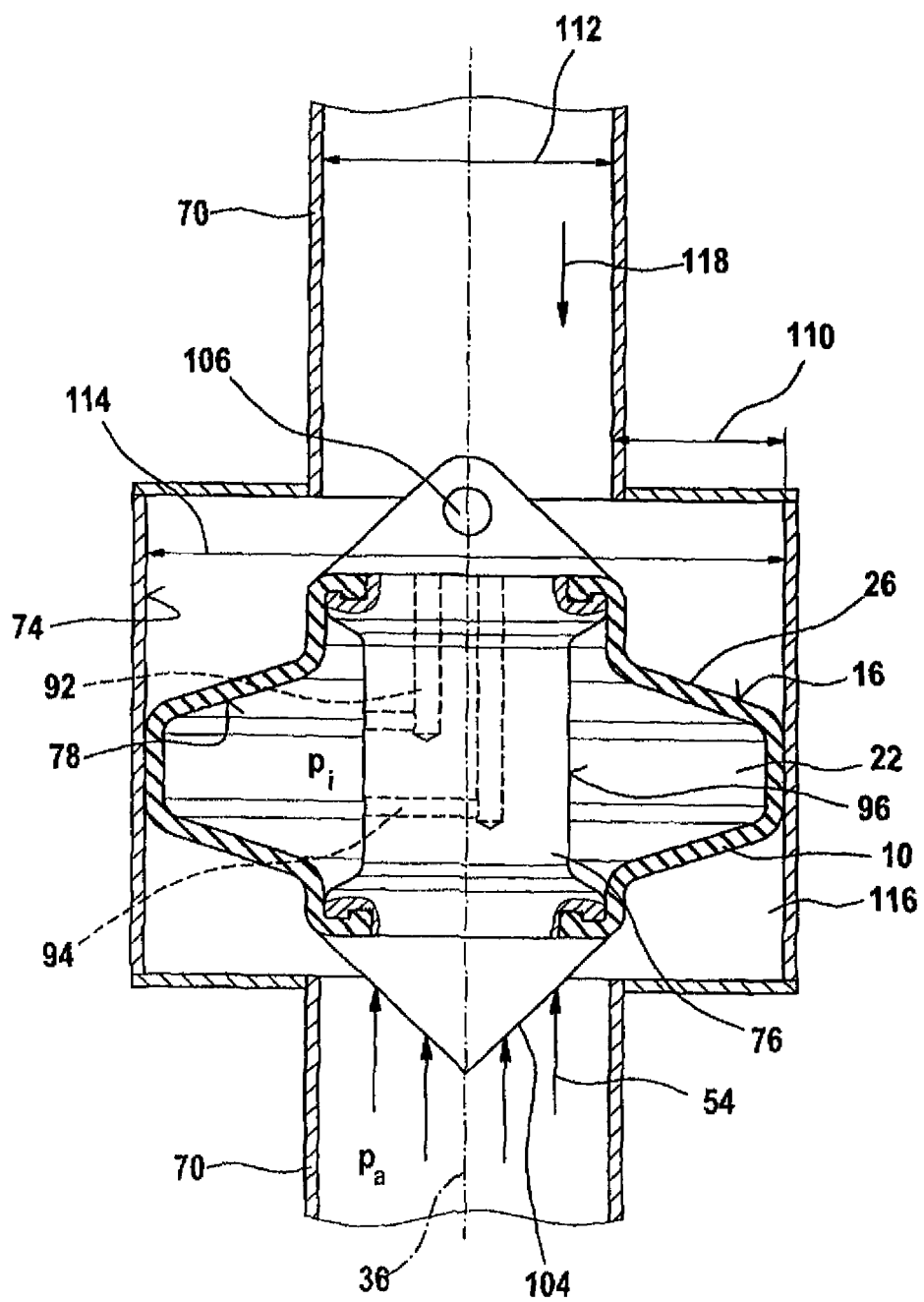

FIG. 8 shows another embodiment of the pressurizable sealing element proposed according to the invention according to FIGS. 1 to 3 with the sealing element according to invention clamped at the plugging element, FIG. 9 shows a plugging head with joint opening and tapered cone, FIG. 10 is an exploded view of the plugging head shown in FIG. 9, FIG. 11 shows the pressurizable sealing element covering the plugging head cavity, FIG. 12 shows a first embodiment of the hingedly deflected pressurizable sealing element, and FIG. 13 shows the pressurizable sealing element proposed according to the invention with a reinforcement associated to its outer lateral surface, FIG. 14 shows an expanded pressurizable sealing element which has been introduced into a diameter expansion of a pipeline.

DESCRIPTION OF EXEMPLARY EMBODIMENTS

FIG. 1 shows a first embodiment of the pressurizable sealing element proposed according to the invention.

As can be seen from FIG. 1, a pressurizable sealing element 10 has a first end face 12 and a second end face 14. A lateral surface 16 extends between said end faces 12, 14, and is formed with a first wall thickness 18 in one axial region and with a second wall thickness 20 in another axial region adjacent to said first axial region. The second wall thickness 20 exceeds the first wall thickness 18. The pressurizable sealing element 10 according to FIG. 1 has a cavity 22 which is partly delimited by the end faces 12, 14 extending in a radial inward direction. The pressurizable sealing element 10 has a U-shape 34 and a first bead-like thickening 30 and another, second bead-like thickening 32 at the inner ends of the first end face 12 and the second end face 14, respectively. FIG. 1 shows the pressurizable sealing element 10 in a state where it is not mounted in a pipeline or a pipe, and is therefore not deformed. A reference numeral 38 indicates an axial length by which the bead-like thickenings 30, 32 protrude from the inner surface of the inner ends of the end face 12 or 14, respectively. The pressurizable sealing element 10 is configured symmetrical with respect to the axis of symmetry 36. An inner pressure for deforming the lateral surface 16 is indicated by $p_i$, while the pressure to be shut-off, $p_a$, prevails at the outer surface 26 of the pressurizable sealing element 10. FIG. 1 shows the second wall thickness 20 and the first wall thickness 18, the lateral surface 16 of the pressurizable sealing element 10, wherein the second wall thickness 20 exceeds the first wall thickness 18 by a factor of at least 2.

FIG. 2 shows another, second embodiment of the pressurizable sealing element proposed according to the present invention.

As shown in FIG. 2, a circumferential sealing lip 40 is located in an axial direction of the lateral surface 16 of the pressurizable sealing element 10 at a side of the lateral surface 16 facing the outer pressure $p_a$ which is to be shut-off. The sealing lip 40 overlaps a free space 42. The outer pressure $p_a$ applied at the outside of the lateral surface 16 of the pressurizable sealing element 10 has an expansion effect 44 so that the circumferential sealing lip 40 which is deformable in a radial direction is able to sealingly contact the inner periphery of a pipe which is not shown in FIG. 1.

Moreover, the pressurizable sealing element 10 illustrated in FIG. 2 includes the two end faces 12, 14 having radial inner ends with two bead-like thickenings 30, 32 for fixing the pressurizable sealing element 10 at a plugging head (not shown). In analogy to the illustration in FIG. 1, the bead-like thickenings 30, 21 form a protrusion 38 in a radial inward direction from end faces 12, 14. The lateral surface 16 has, in analogy to the illustration in FIG. 1, a lateral surface region configured to have a fist wall thickness 18, and another one which is configured to have a second wall thickness 20 which exceeds the first wall thickness 18. Meanwhile, the lateral surface region of the lateral surface 16 configured to have the second wall thickness 20 has a first edge 50 where the circumferential sealing lip 40 is formed, and a second edge 52 opposite to the first edge.

The U-form which is primarily associated to the inner contour of the pressurized sealing element 10 is indicated by a reference numeral 34.

FIG. 3 illustrates another, third embodiment of the pressurizable sealing element 10 proposed according to the invention. As illustrated in FIG. 3, there is a cascade sealing 46 in the lateral surface 16, in particular in the region next to the circumferential sealing lip 40 configured to have a second wall thickness 20. In an axial direction, the cascade sealing is formed behind the circumferential sealing lip 40 of the lateral surface 16 and includes other sealing lips 48 which are axially arranged in a row.

The prevailing circumferential sealing lip 40 covers the free space 42 which is deflected in an expansion direction 44 by the outer pressure $p_a$ still generated at the outer surface 26 of the pressurizable sealing element 10, and therefore acts from the inside to abut the circumferential sealing lip 40 at an inner wall 74 of a pipe 70 or a pipeline 70.

In analogy to the exemplary embodiments according to FIGS. 1 and 2, the bead-like thickenings 30, 32 are arranged at the radial inner ends of end faces 12 and 14 and protrude inwardly by a protrusion length 38 with respect to the inner surfaces of the end face 12, 14. The embodiment of the pressurizable sealing element 10 which is illustrated in FIG. 3 is also symmetrical to the axis of symmetry, and has the U-shape 34 with respect to its inner contour.

FIG. 4 shows another, sleeve-like fourth embodiment of the pressurizable sealing element 10 proposed according to the invention.

Different to the embodiments of the pressurizable sealing element 10 described with reference to FIGS. 1 to 3, the embodiment shown in FIG. 4 has no end faces 12, 14. As a result thereof, the fourth embodiment of the pressurizable sealing element 10 proposed according to invention has radial beads 58, 60 formed in the lateral surface. The lateral surface 16 of the sealing element 10 which has a sleeve-shape 56 is also provided with the region configured to have a second wall thickness 20 and being delimited by the first edge 50 and the second edge 52. A reference numeral 54 indicates the flow direction of the medium to be sealed by the pressurizable sealing element 10. When compared to the embodiments shown in FIGS. 1 to 3, the sealing element 10 shown in FIG. 4 is configured to have a greater axial length.

FIG. 5 shows a fifth embodiment of the pressurizable sealing element 10.

In analogy to the above embodiments described with respect to FIGS. 1 to 3, the first end face 12 and the second end face 14 are included. At their inner ends, the first bead-like thickening 30 and the second bead-like thickening 32 which protrude inwardly from the inner surface of the end face 12, 14 in an axial direction are located. The pressurizable sealing element 10 according to FIG. 5 is symmetrical to the axis of symmetry 36 and includes the cavity 22 which, in its plugging-head-mounted state, is pressurized by a medium, which state is not shown in FIG. 5. The pressurizable sealing element 10 is fixed at a lateral side of a plugging head 76 which is not shown in FIG. 5 via the first bead-like thickening 30 or the second bead-like thickening 32, respectively, by clamping rings.

As can be seen from FIG. 5, a bellows 62 of a wave-shape 64, for example, is located in front of the first edge 50 of the pressurizable sealing element 10 in a flow direction 54. When a liquid or gaseous pressure medium is applied to the cavity 22, the bellows 62 which has the wave shape 64, for example, is operable as an actuator which hingedly deflects the portion of the pressurizable sealing element 10 configured to have a larger material thickness (second wall thickness 20) of the lateral surface 16.

This embodiment of the pressurizable sealing element 10 with a bellows 62 formed in the lateral surface 16 on the side facing the pressure enables a repeated use of the pressurizable sealing element 10 proposed according to the invention at plugging heads 62, and therefore significantly lower costs, while the embodiments of the pressurizable sealing element 10 proposed according to the invention illustrated in FIGS. 1, 2, 3, and 4 should be used only once, if possible.

In analogy to the exemplary embodiments shown in FIGS. 1 to 4, the lateral surface 16 of the pressurizable sealing element 10 according to the embodiment shown in FIG. 5 is configured to have a first thickness 18 and a second thickness 20 which exceeds the first one at least by a factor 2. Below the circumferential sealing lip 40 which is arranged a the first edge of the lateral surface 16 there is the free space 42 which is hit by a medium which is to be shut off and which has a pressure $P_a$ and flows in a flow direction 54, and which deforms the circumferential sealing lip 40 in an outer radial direction and urges it against the inner wall 74 with an inner pressure $p_i$, in a state where the cavity 22 of the pressurizable sealing element 10 is pressurized.

FIG. 6 shows a plugging head on which the pressurizable sealing element having a sleeve shape 56 as shown in FIG. 4 is mounted.

From the illustration according to FIG. 6 it can be seen that the plugging head 76 is introduced into a pipe or pipeline 70 which has an outer surface indicated by 72 and an inner wall indicated by a reference numeral 74. The two radial beads 58, 60 which are formed at the ends of the lateral surface 16 of the pressurizable sealing element 10 are overlapped by first and second inner rings 80, 82 which are configured to have overlapping structures 88. It is preferred that the overlapping structures 88 have a rounded outline. In the embodiment according to FIG. 6, the inner rings 80, 82 are overlapped by outer rings 84, 86. The inner rings 80, 82 and the outer rings 84, 86 enclosing them are screwed together with the end faces of the plugging head 76 via screws 90 and therefore fixed. Of course it is also possible to fix the multi-piece fixation of the radial beads 58, 60 of the pressurizable sealing element 10 which has a sleeve shape 56 with individual rings at the lateral surface of the plugging head 76 in a radial direction.

As can be seen from FIG. 6, the cavity 22 is located between a lateral surface 56 of the plugging head 76 and an inner wall 78 of the pressurizable sealing element 10. The cavity 22 is pressurized, for example pneumatically, via a pressure hole 92 in order to deform the pressurizable sealing element 10 or its lateral surface 16, respectively. Its deformation makes its outer surface 26 abut at the inner wall 74 of the pipe 70 and at the same time bridge the gap 110 and shut off the outer pressure $p_a$ which is applied in the flow section of the pipe 70. In a non-pressurized state of the pressurizable sealing element 10, the gap 110 has a size in a range between 15 and 35 mm and can be easily bridged by the radial deformation, that is the application of a pressurizing medium to the cavity 22, due to the resilience of the elastomeric material of the pressurizable sealing element 10. The solution proposed by the present invention enables a sealing of pressure levels in a range of 8 to 80 bars and more.

For demounting the plugging head 76, the cavity 22 between the plugging head 76 and the inner side 78 of the pressurizable sealing element 10 is first vented or evacuated, for example via a venting line. This is indicated by 94 in FIG. 6. The plugging head is then pivotally deflected, for example by rotation about a joint opening 106 formed in the material of the plugging head 76 and not shown in FIG. 6, so that it can be withdrawn from an opening in the wall of the pipe or pipeline 70 without damaging the pressurizable sealing element 10. It is a wearing part, however, and is replaced for safety reasons by a new sealing element 10 after only one use. The plugging head 76, however, can be used several times without problems.

FIG. 6 shows that the circumferential sealing lip 40 which is arranged above the free space 42 is expanded by the pressure $p_a$ which is applied in a flow direction 54. It is preferred to fix the inner rings 80, 82 and the outer rings 84, 86, in case of a multi-piece embodiment, or one-piece clamping rings via the screws 90 which may also have a bayonet catch 98 for an easier assembly, as indicated in FIG. 6.

FIG. 7 shows another embodiment of the pressurizable sealing element proposed according to the invention mounted to a plugging head.

From the illustration according to FIG. 7 it can be seen that the pressurizable sealing element 10 proposed according to the invention is attached at the periphery of the plugging head 76 which is formed symmetrical with respect to the axis of symmetry 36. In the exemplary embodiment shown in FIG. 7, the bead-like thickenings 30, 32 formed at the first and second end faces 12, 14 of the pressurizable sealing element 10 are embedded in corresponding groove-shaped recesses 100 and 102, respectively, which are formed in the end face material of the plugging head 76. The fixation of the pressurizable sealing element 10 proposed according to the invention is effected via the inner rings 80 and 82, respectively, which have a one-piece configuration in the present embodiment. As shown in FIG. 7, the second inner ring 82, in particular, has an overlapping structure 88 about which the second region of the lateral surface 16 of the pressurizable sealing element 10, which is configured to have the second wall thickness 20, can be hingedly deflected upon pressurization of the cavity 22, for example pneumatically, by a pressurizing medium, via the pressure hole 72. The inner pressure $p_i$ which is generated within the pressurized cavity 22 is in a range of about 16 bars, but may be considerably higher, depending on the outside pressure $p_a$ to be shut-off.

FIG. 7 further shows that the plugging head 36 is provided with a joint opening 106. This opening 106 serves to attach the plugging head in a guiding head which is operable to introduce the plugging head on which the pressurizable sealing element 10 has been mounted into the flow section of the pipeline 70 or pipe 70. This is typically done by opening a flanged aperture which has been formed in advance, to which the repair device including the plugging head 76 and the hydraulic cylinder are flanged for carrying out the repair or the expansion or the like.

When the plugging head 76 is aligned within the flow section of the pipeline 70 or pipe 70, a radially extending gap indicated by a reference numeral 110 is generated. This radial gap 110 has a size in a range of 20 mm to 30 mm, depending on the dimensions of the plugging head 76. In some cases, the radial gap 110 may be even larger.

When the inner pressure $p_i$ is applied to the cavity 22 which is delimited by the inner wall 78 of the lateral surface 16 of the pressurizable sealing element 10 and the lateral surface 96 of the plugging head 76 on the other side, the lateral surface 16 of the pressurizable sealing element 10 bulges radially. Due to the fact that the lateral surface 16 is configured to have a first wall thickness 18 on the side facing the pressure $p_a$ which is to be shut-off, or has a bellows 62 which is operable as an actuator in this region, as indicated in FIG. 5, the lateral surface 16 is hingedly deflected in a region where it is configured to have a second wall thickness 20. Therefore, the outer surface 26 of the lateral surface 16 abuts at the inner wall 74 of the pipeline 70 or pipe 70, respectively, bridging the radial gap 110 and sealing it at the same time. The sealing effect is further improved by the fact that the pressure $p_a$ which is to be shut off and which acts in a flow direction of the media to be shut off is applied to the free space 42 below the at least one circumferential sealing lip 40 and therefore contacts the circumferential sealing lip 40 supportively at the inner wall 74 of the pipeline 70 or pipe 70. This enables an effective sealing of the pressure $p_a$ which is to be shut-off and which may have a level in the range of about 10 bars or considerably higher, in axial and radial directions. A hinged deflection of the lateral surface 16 of the pressurizable sealing element 10 is assisted by the fact that its outer surface 26 abuts at the inner wall 74 of the pipeline or pipe 40, respectively, along an axial length, by adapting itself to the rounded overlap 88. As can be seen from the illustration in FIG. 7, there are supporting shoulders 10 within the cavity, which are formed at the plugging head 76 and which support the inner wall 78 of pressurizable sealing element 10 in a non-pressurized state.

Moreover, FIG. 7 shows that the plugging head 76 has the joint opening 106 at its back, that is at its side which faces away from the pressure $p_a$ to be shut-off, and on the other side has a cone 104 which faces the pressure $p_a$ which is to be shut-off within the flow section of the pipeline 70 or pipe 70.

The illustration according to FIG. 8 shows a pressurizable sealing element of another embodiment, which is mounted to a plugging head.

As can be seen from FIG. 8, supporting shoulders 108 are formed in the cavity 22 in analogy to the embodiment of FIG. 7 by a specific shape of the lateral surface 76 of the plugging head 76. The supporting shoulders 108 support the inner wall 78 of the pressurizable sealing element 10 in a non-pressurized state of the cavity 22 or the pressure hole 92, respectively. The sealing element 10 is provided with a circumferential sealing lip 40 at its outer surface 26, below which there is located a free space 42. The effect of a pressure $p_a$ prevailing in the pipeline 70 or pipe 70 which is to be sealed causes an expansion 44 with respect to the sealing lip 40 which sealingly abuts the inner wall 74 of the pipeline 70 or pipe 70 in a non-pressurized state of the cavity 22. At the same time, the gap 110 shown in FIG. 8 is bridged, so that the flow section of the pipeline 70 or pipe 70, is radially and axially sealed at the end of the plugging head 76 facing away from the cone 104. From FIG. 8 it can also be seen that the pressurizable sealing element 10 is of the type having first end face 12 and the second end face 14 (cf. the exemplary embodiment according to FIG. 2). At the first end face 12 and at the second end face 14 there are arranged the first bead-like thickening 30 or the second bead-like thickening 32, respectively, which extend in a radial inward direction towards the axis of symmetry 36. They are inserted with positive fit in mounting grooves 100 or 102 where the bead-like thickenings 30 or 32 are fixed by the first and second clamping rings 80, 82. The overlapping structure 88 is formed at the second inner ring 82 in a rounded shape towards the outer surface 26 of the lateral surface 16, in order to predefine the deformation of the lateral surface 16 of the pressurizable sealing element 10.

The region of the lateral surface 16 of the pressurizable sealing element 10 configured to have a first wall thickness 18 may also be provided with the bellows 62 formed in the exemplary embodiment according to FIG. 5. When the inner space 22 is pressurized, the lateral surface 16 is hingedly deflected about the rounded bottom side of the overlapping structure 88 by said bellows 62 which is operable as an actuator, in a region which is configured to have the second wall thickness 20, that is it engages the inner wall 74 of the pipeline 70 or pipe 70 to effect an axial and radial sealing.

FIG. 9 shows an exemplary embodiment of the plugging head including a joint hole and a cone.

As can be seen form FIG. 9, the lateral surface 96 of the cavity 22 is open to the pressure hole 92. There through, the cavity 22 is pressurized with an inner pressure $p_i$. As can also be seen from FIG. 9, the pressurizable sealing element 10 is fixed at both sides at the plugging head 76 by the inner rings 80, 82. The inner rings 80 and 82 respectively are attached by the screws 90, if necessary using a bayonet catch 98. The plugging head 76 is formed symmetrically with respect to the axis of symmetry 36 and has a radial gap 110 extending between the outer surface 26 of the pressurizable sealing element 10 and the inner wall 74 of the pipeline 70 or pipe 70. The outer wall of the latter is indicated by a reference numeral 72. As can also be seen from FIG. 9, the cone 104 of the plugging head 76 faces the pressure $p_a$ which is to be shut off, while the opening 106 which is operable to align and guide or position the plugging head 76, respectively, is formed at the end of the plugging head 76 facing away from the cone 104. In the embodiment according to FIG. 9, the inner rings 80 and 82, respectively, have a one-piece form including an overlapping structure 88, in comparison to the exemplary embodiment according to FIG. 6, where the clamping rings can also have a multi-piece form. FIG. 9 also shows that the shape of the lateral surface 96 within the cavity provides supporting shoulders 108 which are formed in the cavity 22 and which support the bottom 78 of the pressurizable sealing element 10 from below.

FIGS. 10 and 11 show an enlarged exploded view and a perspective view, respectively, of the pressurizable sealing element.

From FIG. 10 it can be seen that the disk-shaped clamping rings 80 and 82, respectively, which have a one-piece form in this case are fixed by screws with corresponding threaded blind holes which are formed in the end faces of the plugging head 76. As can also be seen from the exploded view according to FIG. 10, a radially extending circumferential overlapping structure 88 is formed along the outer periphery of the inner rings 80 or 82, which is rounded at its bottom side. It overlaps the pressurizable sealing element 10 in an edge region. It is illustrated in a sectional view in FIG. 10 and includes the circumferential sealing lip 40 at its lateral surface 16. The pressurizable sealing element 10 according to the illustration in FIGS. 10 and 11 includes the end faces 12 and 14, respectively, which are formed with bead-like thickenings 30 and 32, respectively, at their radial inner ends. These thickenings are engaged with the mounting grooves 100 or 102, as can be seen from FIG. 11, and fixedly secure the pressurizable sealing element 10 which has been embedded in the mounting grooves 100 and 102, respectively, by mounting the inner rings 80 and 82, respectively, at the plugging head 76 in its mounting position. From the perspective sectional view of FIG. 10, the course of the pressure hole 92 for pressurizing the cavity 22 with a hydraulic fluid or a gaseous medium can also be seen. As is shown especially in the perspective semi-sectional view according to FIG. 10, the plugging head 76 essentially fills the flow section of the pipeline 70 or pipe 70. Only at the edge of the outer surface 26 of the pressurizable sealing element 10, clamped between the inner rings 80 to 82, there remains a gap 110 which is sealed against the pressure $p_a$ to be shut-off upon pressurization of the cavity 22 by deforming or deflecting the pressurizable sealing element 10 in a radial and an axial direction.

As can be seen from FIG. 11, the circumferential sealing lip 40 formed at the side of the pressurizable sealing element 10 facing the pressure $p_a$ which is to be shut off covers the free space 42. Due to the applied pressure $p_a$ which is to be shut-off, the free space 42 advantageously causes a radial expansion 44 acting on the circumferential sealing lip 40, assisting its engagement and therefore its sealing effect at the inner wall 74 of the pipeline 70 or pipe 70.

FIG. 12 shows the pressurizable sealing element 10 proposed according to the present invention in case of a cavity which is pressurized with an inner pressure $p_i$.

As can be seen from FIG. 12, the inner pressure $p_i$ prevailing in the cavity 22, which may for example be in a range of up to 16 bars, acts on the inner wall 78 of the lateral surface 16 of the pressurizable sealing element 10 and therefore engages the same at its outer surface 26 with the inner wall 74 of the pipeline 70 or pipe 70. The pressure $p_a$ which is to be shut off and which acts in a flow direction 74 helps to support the circumferential sealing lip 40 and engages it with the inner wall 74 of the pipeline 70 or the pipe 70 due to the pressure $p_a$ which is applied on its bottom side in the free space 42.

From FIG. 12 it can be seen that the outer surface 26 of the lateral surface region of the lateral surface, which is configured to have a second wall thickness 20, is hingedly deflected about the rounded bottom of the overlapping structure 88. The hinged upwards-pivoting of the region of the lateral surface 16 of the pressurizable sealing element 10 configured to have a second wall thickness 20 is assisted by the provision of a bellows 62 operable as an actuator at the lateral surface 16 which is configured to have the first wall thickness 18. It is preferably of a wave-shape 64 and is operable as an actuator with the respect to the hinged deployment of the region of the lateral surface 16 configured to have a second wall thickness 20 about the rounded overlapping structure 88. A process-reliable mounting of the pressurizable sealing element 10 is ensured by the static, bead-like thickenings 30 and 32, respectively, which extend with different diameters and therefore always enable a mounting of the pressurizable sealing element 10 in a position where the at least one sealing lip 40 or the cascade sealing 46, respectively, at the outer surface 26 of the lateral surface 16 faces the pressure $p_a$ to be shut-off. In a state where the cavity 22 is pressurized, the inner wall 74 which is pressurized with the inner pressure $p_i$ detaches from the supporting shoulders 108 formed in the lateral surface 96 of the plugging body 76. The sealing of the cavity 22 is effected by the axial biasing force of the inner rings 80 and 82, respectively, with respect to the first and second end faces 12 and 14, respectively, of the pressurizable sealing element 10. A reference numeral 38 indicates a protrusion length by which the bead-like thickenings 30 and 32, respectively, protrude over the inner side of the first and second end faces 12 and 14, respectively, of the pressurizable sealing element into corresponding mounting grooves 100, 102 of the plugging head 76.

Finally, FIG. 11 shows an embodiment which is especially adapted to resist maximum pressures. When the cavity 22 which is delimited by the lateral surface 96 of the plugging head 76 on the one side, and by the inner wall 78 of the pressurizable sealing element 10, is pressurized by a maximum pressure of 80 bars, a reinforcement of the hingedly deflected region of the lateral surface 16 of the pressurizable sealing element 10 configured to have the second, larger wall thickness 20, is necessary. This reinforcement is preferably implemented by a reinforcing fabric 120. The reinforcing fabric 120 may be formed at the outer surface 26 of the lateral surface 12, as indicated in FIG. 13. Moreover, the fabric reinforcement 120 of an exemplary embodiment not shown in the drawings may also be laminated or cured into the material of the pressurizable sealing element 10, that is into the deformable of region its lateral surface 16. The reinforcing fabric 120 may be a cured-in Nomex sheet, an aramide, a PTFE (Teflon) wrapping tape; a polyamide wrapping tape or a spring steel tape or a slit bracket sheet or the like may also be used. The reinforcing fabric 120 enables the elastomeric material or plastics material, respectively, on which the pressurizable sealing element 110 is manufactured by injection molding or by extrusion, to mechanically withstand the maximum pressures $p_i$ which can be generated in the cavity 22. If, for example, the pressure to be shut-off is about 80 bars, a radial expansion of the lateral surface 16 of the pressurizable sealing element 10 by an inner pressure $p_i$ exceeding a pressure $p_a$ which is applied from the outside is required. After the sealing is complete, the pressure on the side of the piping 70 or pipe 70 facing away from the pressure to be shut-off decreases to atmospheric pressure. In order to permanently and process-reliably shut off an occurring pressure difference $\Delta p$ of 80 bars or more, the reinforcement 120 may be implemented by a reinforcing fabric, for example, or another alternative.

The pressurized state of the cavity 22 is shown in FIG. 13 leads to the abutment of the circumferential sealing 40 due to the pressure $p_a$ to be shut off which is applied to the free space 42, as already described with reference to FIG. 12. Although not shown in the drawings, the bellows 62 indicated in FIG. 12, which is operable as a swellable seal, that is as an actuator, may be formed in the region of the lateral surface 16 configured to have a thinner, first wall thickness 18. In order to hingedly deflect the region of the lateral surface 16 configured to have larger, second wall thickness 20, the lateral surface 16 may be only formed with the first, thinner wall thickness 18.

In the present context, the above reference of the circumferential sealing lip 40 at the side of the lateral surface 16 facing the pressure $p_a$ to be shut off, which is configured to have a second wall thickness 20, also encompasses the embodiment of the pressurizable sealing element proposed according to the invention which is shown in FIGS. 3 and 4, wherein a cascade sealing 46 is formed at the outer surface 26 of the lateral surface 16 of the pressurizable sealing element 10, which may have a plurality of sealing lips 48 formed in a row in an axial direction.

FIG. 14 shows that the pressurizable sealing element 10 proposed according to the invention may also be used to seal a chamber-like expansion (cf. numeral 116).

As shown in FIG. 14, the plugging head 76 is introduced in a state where the cavity 22 is not pressurized in a vertical direction, for example, into a pipeline or pipe 70 by an insertion device indicated by a reference numeral 118. It includes a portion which is accommodated in a first diameter 112. In an insertion direction 118, a second portion is located at said portion, where the pipeline or pipe 70 has a second diameter 114 which exceeds the first diameter 112 considerably or at least by a radial gap 110.

If the plugging head 76 is inserted into this region, that is into the region of the pipeline or pipe 17 configured to have the second diameter 114, this second diameter 114 can also be sealed due to the extreme deformation capacity of the pressurizable sealing element 10, as indicated in FIG. 14. The plugging head 76 is inserted into the piping 70 or pipe 70 in an insertion direction 118 when the cavity 22 is not pressurized. As soon as the plugging head 76 reaches the region of the piping 70 or pipe 70, where the second diameter 114 is provided, a pressure medium which may be either liquid or gaseous can be introduced into the cavity 22 via the pressure hole 92, and the lateral surface 16 of the pressurizable sealing element can be fixedly secured. Depending on the pressurization of the cavity 22, the radial gap 110 within the chamber 116 can be completely bridged, that is a sealing can be effected; it is, however, also possible to leave a remaining radial gap 110 between the outer surface 26 of the deformable lateral surface 16 and the inner wall 74 of the pipeline or pipe 70 within the chamber 116, by a controlled pressurization of the cavity 22. This defined pressurization of the cavity 22 enables a volume flow in a flow direction 54 to pass the chamber-like expansion 116 formed with a second diameter 118. The width of the remaining radial gap 110 depends on the pressure which is applied to the cavity 22 of the plugging head 76 through the pressure hole 92, and on the deformation of the lateral surface 16 of the pressurizable sealing element 10. It may for example have the bellows 62 operable as an actuator which has a wave-shape 64, as shown in FIG. 5; moreover, it is also possible to provide a first material thickness 18 in the region of the lateral surface 16 facing the pressure $p_a$ to be shut off and being operable as an actuator with respect to the remaining second wall thickness 20 of the lateral surface 16, by engaging the same with the inner wall 74 to be sealed in a radial outward direction. If very high pressures have to be shut-off securely and process-reliably, it may be expedient in case of large pressure differences Δp to provide a reinforcement or reinforcing fabric 120 in front of and behind the pressurizable sealing element 10, which seals the large pressure difference between a pressure $p_a$ which has to be shut off and is in the range of 80 bar, and the atmospheric pressure p, for example.

The pressurizable sealing element 10 proposed according to the invention may be applied at plugging heads 76, for example, in a hot-tapping process for repairing oil- or gas-conducting pipelines 70. Moreover, the pressurizable sealing element 10 proposed according to the invention may be applied at plugging heads 76 or the like, or for sealing water pipes in a range of 16 inches inner diameter and even more. Based on the pressurization of the cavity 22, the radial gap 110 between the outer surface 26 of the lateral surface 16 and the inner wall 74 of the piping 70 or pipe 70 to be sealed may be completely bridged, or a remaining radial gap 110 may be allowed which enables a volume flow, and which constantly passes a medium flow. This may be desirable, for example, for metering purposes in order to let a remaining volume flow pass the flow section.

Furthermore, the pressurizable sealing element 10 proposed according to the invention may be applied for container or vessel engineering purposes in addition to the complete sealing of pipelines opening towards the container or vessel, and for a defined narrowing of the flow section of such a pipeline. This enables a utilization of the remaining gap for metering a volume flow corresponding to the remaining free flow section.

Moreover, the pressurizable sealing element 10 proposed according to the invention, which is mounted at a plugging head 76, may also be used for sealing bore holes or the like in case of upstream processes. Upstream processes refers to processes for producing oil or gas travelling a path until it reaches the surface of the earth, as is the case for example, with exploration drilling or sinking or drilling of production wells. Furthermore, the pressurizable sealing element 10 proposed according to the invention may be used in processes wherein the piping 70 or the pipeline 70 has a diameter step from a first diameter 112 to a second diameter 114, as indicated in FIG. 14. In a state where the cavity 22 is not pressurized, the plugging head 76 on which the pressurizable sealing element 10 is mounted is introduced through the narrower section and is radially deformed by pressurizing the cavity 22 or 92, respectively, into a chamber-like expansion 116, such that either a complete sealing against the applied outer pressure $p_a$ or a defined remaining radial gap may be formed.

If the pressurizable sealing element 10 proposed according to the invention is configured to have smaller sizes, it may also be used for sealing doors and windows. To this end, the pressurizable sealing element 10 may either be formed at the outer side of the section of the pivotable window or the openable door or may as an alternative be integrally formed with the stationary window frame or the stationary door case. Advantageously, the pressurizable sealing element 10 may be pneumatically pressurized due to the generated closing pressure of the door pane or the window casement, respectively, when the door is being closed. When the door is opened, the pressure stored within the cavity of the pressurizable sealing element 10 due to the closing process is automatically released. The same applies for windows which may be provided along their entire circumferential length of their four sides with the pressurizable sealing element 10, while in case of doors the pressurizable sealing element 10 is preferably mounted in the floor side edge. In these application examples, the pressurization of the pressurizable sealing element 10 is preferably effected by an air pump which is integrally formed with the door casing or the window frame, and which has also a dampening effect for the air volume sealed within the pressurizable sealing element 10 which is circumferentially formed.

| List of reference numerals | |
|---|---|
| 10 | pressurizable sealing element |
| 12 | first end face |
| 14 | second end face |
| 16 | lateral surface |
| 18 | first wall thickness |
| 20 | second wall thickness |
| 22 | cavity |
| 24 | inner pressure $p_i$ |
| 26 | outer surface |
| 28 | pressure $p_a$ to be shut off |
| 30 | first bead-like thickening |
| 32 | second bead-like thickening |
| 34 | U-shape |
| 36 | axis of symmetry |
| 38 | protrusion |
| 40 | circumferential sealing lip |
| 42 | free space |
| 44 | expanding effect |
| 46 | cascade sealing |
| 48 | additional sealing lips |
| 50 | first edge |
| 52 | second edge |
| 54 | flow direction of medium to be shut off |
| 56 | sleeve shape |
| 58 | first radial bead |
| 60 | second radial bead |
| 62 | bellows |
| 64 | wave form |
| 70 | pipeline, pipe |
| 72 | outer surface |
| 74 | inner wall |
| 76 | plugging head (plug) |
| 78 | inner wall sealing element |
| 80 | first inner ring |
| 82 | second inner ring |
| 84 | first outer ring |
| 86 | second outer ring |
| 88 | rounded overlapping structure |
| 90 | screw |
| 92 | pressure hole |
| 94 | venting/vacuum hole |
| 96 | lateral surface plugging head |
| 98 | bayonet catch |
| 100 | first mounting groove |
| 102 | second mounting groove |
| 104 | cone |
| 106 | joint opening |
| 108 | supporting shoulder |
| 110 | radial gap |
| 112 | first diameter of 70 |
| 114 | second diameter of 70 |
| 116 | chamber-like expansion |
| 118 | insertion direction |
| 120 | reinforcing fabric |

The invention claimed is:

1. A sealing element configured to be mounted at a plugging head for plugging a flow section of a pipeline or pipe when the plugging head is introduced into an access opening of the pipeline or a pipe, wherein said sealing element when mounted at said plugging head delimits a single pressurizable cavity and seals an inner wall of the pipeline or the pipe when a first pressure $p_i$ is applied to the cavity, the sealing element comprising:

a lateral surface formed by only one single first axial region and only one single second axial region connected to the first axial region, the second axial region being configured to have a larger wall thickness than the first axial region, so that the lateral surface of the sealing element is asymmetrical from end to end, and a first attachment point immediately adjacent to the single first axial region and a second attachment point immediately adjacent to the single second axial region so that the first and second axial regions are disposed between and bordered by the two attachment points, wherein the attachment points are configured for attaching the sealing element to the plugging head;

wherein said second axial region is configured to be hingedly deflected about the second attachment point by a second pressure $p_a$ which is to be shut off within the pipeline or pipe, and wherein the second attachment point is located at a side of the plugging head which faces away from the second pressure $p_a$, and wherein the second axial region seals the inner wall of the pipeline or pipe in a state where the cavity is pressurized.

2. The sealing element according to claim 1, wherein the sealing element radially and axially seals a radial gap between the lateral surface and the inner wall of the pipeline or the pipe in a state where the at least one cavity is pressurized.

3. The sealing element according to claim 1, wherein the pressurizable cavity is vented or applied with a negative pressure via an opening for a demounting of the plugging head.

4. The sealing element according to claim 1, wherein the sealing element is supported at an inner wall of the sealing element by supporting shoulders which are formed in a lateral surface of the plugging head.

5. The sealing element according to claim 1, wherein the first axial region comprises a bellows operable as an actuator at the lateral surface of the sealing element.

6. The sealing element according to claim 5, wherein the bellows at the lateral surface of the sealing element is located in a region which faces the second pressure $p_a$ to be shut off.

7. The sealing element according to claim 1, wherein the lateral surface of the sealing element has at least one circumferential sealing lip which partially surrounds a free space.

8. The sealing element according to claim 7, wherein the at least one circumferential sealing lip is configured such that when the second pressure $p_a$ which is to be shut off is applied to the free space, the second pressure $p_a$ deflects the circumferential sealing lip in a radial direction so that the at least one circumferential sealing lip contacts the inner wall of the pipeline or the pipe.

9. The sealing element according to claim 7, wherein the bead-like thickenings at the end faces have first and second diameters about an axis of symmetry of the sealing element, said first and second diameters differing from each other and which ensure a mounting of the sealing element such that the circumferential sealing lip always faces the second pressure $p_a$ which is to be shut off.

10. The sealing element according to claim 1, wherein only the second axial region of the lateral surface is provided with a reinforcing fabric.

11. The sealing element according to claim 10, wherein the reinforcing fabric is embedded in the lateral surface or extends on the outer surface of the lateral surface of the sealing element towards the side of the sealing element which faces away from the second pressure $p_a$.

12. The sealing element according to claim 10, wherein the reinforcing fabric comprises a PTFE wrapping tape, a cured-in flame resistant meta-aramid layer, an aramide layer, a polyamide wrapping tape, a spring steel tape, a para-aramid synthetic fiber sheet or a slit bracket sheet iron.

13. The sealing element (10) according to claim 1, wherein the sealing element has bead-like thickenings for axially fixing the sealing element at the plugging head from two sides.

14. The sealing element according to claim 13, wherein said bead-like thickenings (30, 32) are formed at a first end face and a second end face of the sealing element.

15. The sealing element according to claim 13, wherein the bead-like thickenings are formed at the lateral surface of the sealing element and wherein the sealing element has a sleeve shape.

16. The sealing element according to claim 15, wherein the bead-like thickenings are overlapped by one-piece or two-piece clamping rings.

* * * * *